UNITED STATES PATENT OFFICE.

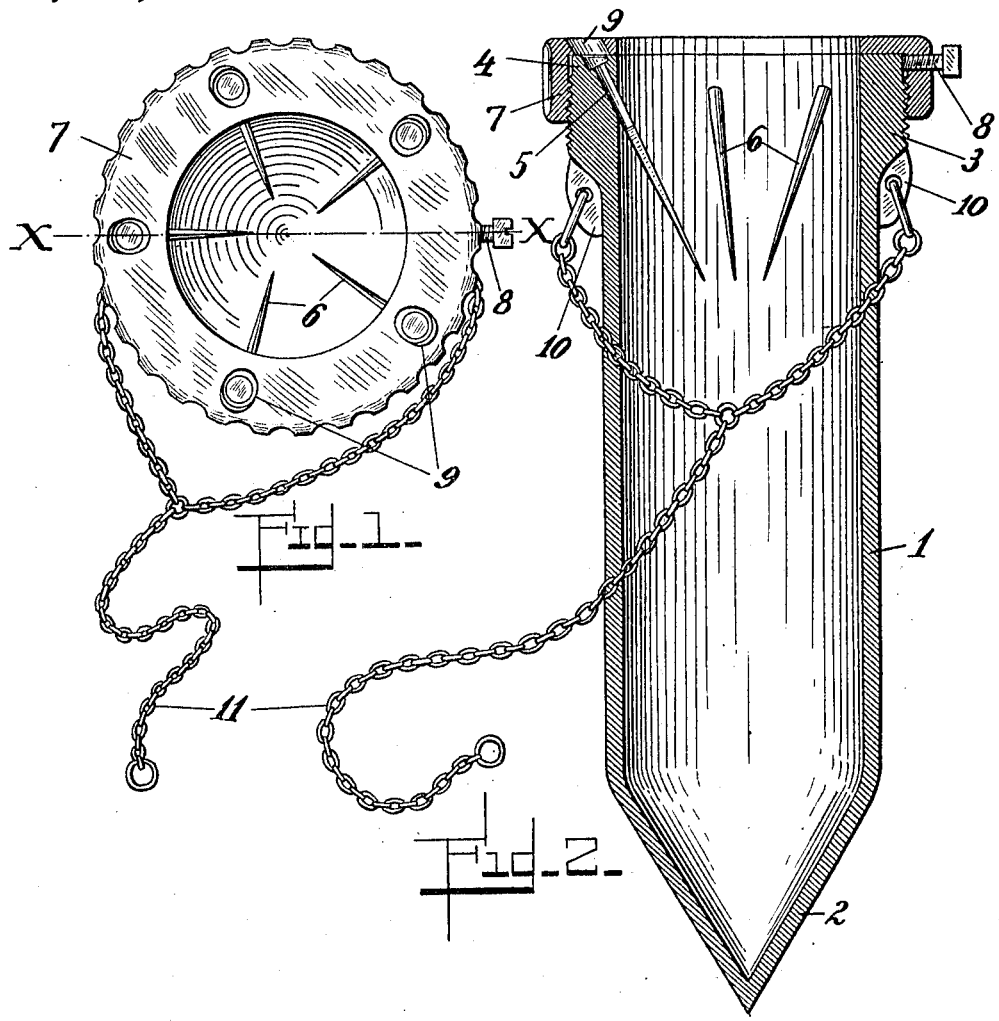

BENJAMIN M. FIKES, OF CAMERON, TEXAS.

ANIMAL-TRAP.

1,054,344.

Specification of Letters Patent.

Patented Feb. 25, 1913.

Application filed September 30, 1912. Serial No. 723,023.

*To all whom it may concern:*

Be it known that I, BENJAMIN M. FIKES, a citizen of the United States, residing at Cameron, in the county of Milam and State of Texas, have invented certain new and useful Improvements in Animal-Traps, of which the following is a specification.

My invention relates to new and useful improvements in animal traps, and relates more particularly to such traps as are employed to catch small fur bearing animals—such as minks, otter, raccoons, etc.

The object of the invention is to provide a trap having the nature of a hollow cylinder closed at one extremity and adapted to be vertically embedded in the ground, with its open end substantially flush with the surface of the ground, a plurality of spikes projecting convergently downward being provided within the cylinder adjacent to the open end, which spikes will yield to admit the paw of an animal reaching for bait contained in the bottom of the cylinder, but will tend to securely grip the animal's paw when an attempt is made to withdraw the same.

A further object is to provide a convenient means for normally retaining said spikes in their operative positions, and for permitting the spikes to be withdrawn from such position when it is desired to extricate an animal from the trap.

Finally the object of the invention is to provide a device of the character described, that will be strong, durable, simple and efficient and comparatively easy to construct, and also one that will not be likely to get out of working order.

With these and various other objects in view, my invention has relation to certain novel features of the construction and operation, an example of which is described in the following specification, and illustrated in the accompanying drawing, wherein:

Figure 1 is an end view of the trap, the open end of the same being shown. Fig. 2 is a vertical sectional view taken upon the line X—X of Fig. 1. Fig. 3 is view in side elevation showing the trap embedded in the ground as when in use, the means employed to prevent the trap being dragged away by any animal also being shown.

Referring now more particularly to the drawing, wherein like reference characters designate similar parts in all the figures, the numeral 1 denotes a hollow metal cylinder, having an integral closure 2 of conical form at one extremity. An increased thickness is given to the cylinder 1 at its open extremity by the formation upon the exterior cylinder surface of an integral collar 3 provided with screw-threads. An annular portion of the collar 3 closely adjacent to the open extremity of the cylinder is of a somewhat reduced diameter as indicated at 4, this portion being adapted to form a seat for a set-screw as will presently be explained. A plurality of equidistant tubular apertures 5 are provided in the cylinder 1 adjacent to the open extremity of the same, said apertures being inclined at an acute angle to the axis of the cylinder, each aperture having one of its extremities opening in the end wall of the cylinder and the other end communicating with the cylinder interior. A sharp pointed spike 6 is adapted to be inserted into each aperture 5, the heads of said spikes being countersunk in the end wall of the cylinder. When the spikes are all in place, their points will lie in a plane transverse with the cylinder and will be separated from each other a sufficient distance to permit an animal to insert its paw into the cylinder by slightly distorting the spikes from each other. In order that such distortion of the spikes may take place, they will be formed of spring steel drawn to a fine point.

The means employed to normally retain the spikes in their proper positions relative to the cylinder and to each other will now be described. This means comprises an apertured cap 7 provided with an interiorly threaded flange adapted to engage the threads carried by the collar 3. The central aperture of the cap 7 is substantially equal in diameter to the interior diameter of the cylinder, as is clearly shown in Fig. 2 of the drawing. When the cap 7 is screwed into place, it will come into contact with the end surface of the cylinder, covering the countersunk heads of the spike 6 and preventing displacement of said spikes. The cap 7 is provided with a plurality of equidistant apertures 9 equal in number to the spikes 6, and adapted through rotation of the cap 7 to be brought into alinement with the apertures 5. The apertures 9 are inclined at an angle with the central axis of the cap 7, the angle of inclination being equal to that of the apertures 5. It is thus apparent that when the cap 7 is rotated to such a position as to bring the apertures 9 into alinement with the apertures 5, the spikes 6 may be withdrawn from their normal positions by displacement through the apertures 9. As a safe-guard to prevent the collars 7 rotating to such a position that the spikes 6 may escape, the said collar is provided with a set screw 8 the extremity of which is adapted to bear upon the seat formed by the annular portion 4 of the collar 3.

At the juncture of the collar 3 with the main body of the cylinder 1, a pair of diametrically opposite lugs 10 are provided upon the outer face of the cylinder. To each of these lugs is secured a short piece of chain connecting with a longer piece of chain 11 by which the trap may be secured to some anchorage—as for example—a stake 12.

The cap 7 will preferably be fluted upon its exterior surface to facilitate the screwing and unscrewing of the cap upon the cylinder extremity.

In trapping animals by means of the above described device, the cylinder 1 will preferably be embedded upon the bank of some stream, as is illustrated in Fig. 3 of the drawing. Some suitable form of animal bait, as for example fish or honey, will be disposed in the bottom of the cylinder 1. An animal endeavoring to reach this bait will force its paw into the cylinder spreading the pointed extremities of the spikes 6 apart. When an attempt is made by the animal to withdraw its paw, the inclined spikes 6 pressing upon the paw will be driven beneath the skin thereof, and prevent the animal from escaping. In case the animal in its struggle succeeds in un-earthing the cylinder 1, it will be prevented from walking off with the trap owing to the fact that the chain 11 is anchored at the point 12.

It is to be observed that an animal caught in the trap may be extricated either by bringing the apertures 9 into alinement with the apertures 5 or by entirely removing the cap 7, so that the spikes 6 may be readily removed from their operative positions.

The invention is presented as including all such modifications as properly come within the scope of the following claims.

What I claim is:

1. An animal trap comprising a hollow cylinder closed at one extremity, a plurality of spikes mounted in the cylinder wall adjacent to the open end of the cylinder, said spikes being inclined toward the closed end of the cylinder and toward the cylinder axis, and a cap threaded upon the open end of the cylinder adapted to normally prevent removal of said spikes.

2. An animal trap comprising a hollow cylinder closed at one extremity, a plurality of spikes mounted removably in apertures provided in the cylinder wall adjacent to the open end of the cylinder, said spikes being inclined toward the cylinder axis and toward the closed end of the cylinder, a cap adapted to be secured upon the open end of the cylinder and adapted to cover the heads of said spikes, said caps being provided with a plurality of apertures which when brought into alinement, with the spikes serves to permit the latter to be withdrawn.

In testimony whereof I have signed my name to this specification in the presence of two subscribing witnesses.

BENJAMIN M. FIKES.

Witnesses:
J. S. MURRAY,
CALLIE MORGAN.

---

Copies of this patent may be obtained for five cents each, by addressing the "Commissioner of Patents, Washington, D. C."